United States Patent
Haas et al.

(10) Patent No.: US 6,575,083 B2
(45) Date of Patent: Jun. 10, 2003

(54) BAKING DEVICE FOR PRODUCING ENDLESS BANDS

(75) Inventors: Franz Haas, Vienna (AT); Johann Haas, Klosterneuburg (AT); Erich Koletnik, Klosterneuburg (AT)

(73) Assignee: Franz Haas Waffelmaschinen Industrie Aktiengesellschaft, Vienna (AT)

( * ) Notice: Subject to any disclaimer, the term of this patent is extended or adjusted under 35 U.S.C. 154(b) by 0 days.

(21) Appl. No.: 10/001,175

(22) Filed: Nov. 2, 2001

(65) Prior Publication Data

US 2003/0037683 A1 Feb. 27, 2003

Related U.S. Application Data

(63) Continuation of application No. PCT/AT00/00086, filed on Apr. 10, 2000.

(30) Foreign Application Priority Data

May 4, 1999 (AT) ................................................ 795/99

(51) Int. Cl.$^7$ ............................ A23L 1/00; A47J 37/00; A21B 1/48; A21B 5/03
(52) U.S. Cl. ........................ 99/353; 99/427; 99/443 R; 99/450.1
(58) Field of Search ................. 99/339, 340, 353–355, 99/372–379, 386, 450.1, 443 R, 443 C, 426, 427, 476–479; 126/21 A, 149; 198/432, 459.5; 219/388, 400; 432/112–114

(56) References Cited

U.S. PATENT DOCUMENTS

| 3,926,105 A | * | 12/1975 | Warning, Sr. ................ 99/423 |
|---|---|---|---|
| 3,946,656 A | | 3/1976 | Hai |
| 4,283,171 A | * | 8/1981 | Bronnec .................... 432/112 |
| 4,417,508 A | * | 11/1983 | Haas, Sr. et al. ............. 99/355 |
| 4,655,125 A | * | 4/1987 | Ishida et al. .................. 99/355 |
| 4,669,603 A | * | 6/1987 | Haas, Sr. et al. ........... 198/432 |
| 4,675,487 A | * | 6/1987 | Verkasalo ............... 219/471 X |
| 4,694,741 A | * | 9/1987 | Haas, Sr. et al. ............. 99/354 |
| 4,775,773 A | * | 10/1988 | Verkasalo ................. 99/353 X |
| 4,953,453 A | * | 9/1990 | Haas, Sr. et al. ............. 99/373 |
| 5,048,403 A | * | 9/1991 | Haas, Sr. et al. ............. 99/355 |
| 5,103,717 A | * | 4/1992 | Haas, Sr. et al. ............. 99/353 |
| 5,463,939 A | * | 11/1995 | Koletnik et al. .............. 99/353 |
| 5,795,607 A | * | 8/1998 | Haas et al. ................ 99/443 C |
| 5,988,047 A | | 11/1999 | Haas et al. |

FOREIGN PATENT DOCUMENTS

| WO | WO 92/15183 | 9/1992 |
|---|---|---|
| WO | WO 97/34492 | 9/1997 |

* cited by examiner

Primary Examiner—Timothy F. Simone
(74) Attorney, Agent, or Firm—Laurence A. Greenberg; Werner H. Stemer; Ralph E. Locher

(57) ABSTRACT

The baking device produces endless strips of baked goods from pourable baking dough. A cylindrical baking ring of metal is disposed to rotate about its central axis, while it is supported outside its center. The baking ring has one or more endless baking surfaces on which the strips are produced. A stationary depositing device deposits baking mass onto the rotating baking surface before the baking surface travels into a baking zone. A stationary receiving device removes the at least partially baked strips from the baking ring for further processing. A stationary electrical induction coil is disposed in the baking zone. The induction coil is arranged adjacent the baking ring so that the ring, as it moves through the magnetic field of the coil, is heated by induction for generating heat with which the strips are baked from below.

16 Claims, 2 Drawing Sheets

BAKING DEVICE FOR PRODUCING ENDLESS BANDS

CROSS-REFERENCE TO RELATED APPLICATION

This is a continuation of copending International Application PCT/AT00/00086, filed Apr. 10, 2000, which designated the United States.

BACKGROUND OF THE INVENTION

Field of the Invention

The invention relates to a baking device for producing endless bands by means of heat from above and heat from below, and to a facility for producing and processing endless bands, having a baking device, which produces the bands by means of heat from above and heat from below, and at least one processing station, arranged downstream of the baking device, for the bands produced by the baking device.

The baking device has a cylindrical baking ring made of metal. The baking ring revolves continuously around its central axis in one direction, and is mounted rotatably outside its central axis in the stationary machine stand of the baking device. The baking ring moves an endless baking surface through a stationary baking zone which is provided with a heating device, which is arranged at a distance above the baking surface and generates heat from above, and extends in the running direction of the baking ring from a feeder device, which applies a pourable baking mass onto the baking surface, as far as a removal device for the at least partially baked band produced on the baking surface from the baking mass.

An earlier baking devices of this type, as described for example in our prior U.S. Pat. No. 5,988,047 and our international PCT publication WO 97/34492, are heated by gas. The revolving baking ring is heated by gas burners or by infrared radiators that are heated by gas, which are arranged successively along its inside and along its outside, convey their heat to the baking ring and to the band resting thereon and formed from the baking mass, and convey their combustion gases to the interior of the casing of the baking device. The combustion gases are discharged upward out of the casing together with the steam which arises during the baking process in the band formed by the baking mass and is emitted from the band into the interior of the casing, and together with the air which is sucked into the casing, mainly at the lower side of the casing. The sucked-in air is firstly needed as combustion air for the operation of the gas burners or gas-heated infrared radiators, and secondly for lowering the temperature in the interior of the casing, the interior being heated by the very hot combustion gases to temperatures in the range of 600° C.–900° C. for example, in accordance with the combustion temperature of the gas used in each case. In order to keep the interior of the casing to a temperature which is clearly below the combustion temperature of the gas used in each case and which corresponds essentially to the baking temperature of the particular band (for example, in the range from 200° C.–250° C.), very large quantities of air exceeding the requirement with regard to combustion air have to be sucked into the casing and discharged again from the casing through its exhaust together with the combustion gases and the steam. For this purpose, a plurality of air inlet openings of relatively large overall cross section are required in the heat-insulating jacket surrounding the interior of the casing, and the exhaust of the casing has to be designed in terms of its exhaust cross section and the suction volume of its discharge fan to handle a very large volume of gas which is composed of the volume of the sucked-in air and of the volumes of combustion gases and steam which arise in the interior of the casing. In the known baking device, the revolving baking ring can be surrounded by a heat-insulating, essentially C-shaped casing jacket which, by means of its recess projecting into the interior of the baking ring, reduces the volume of the casing which is heated by the combustion gases and has to be cooled down by the admixture of air. In the known baking device, two or more baking zones may in each case be arranged laterally next to one another on the inside and on the outside of the baking ring, so that four or more bands formed in each case from baking mass are baked simultaneously on the baking ring, the bands conveying the steam arising in them during the baking process to the interior of the casing, and, as a result, increasing the volume of gas to be discharged from the casing.

In the food and confectionery industry, baking devices that are heated by gas are generally used for producing endless bands of pourable baking masses or baking doughs, such as liquid wafer dough. The devices are provided with a rotating baking drum comprising a central, horizontally arranged hub, a circular, vertically arranged supporting disk connected integrally to the hub, and an outer, cylindrical drum jacket which is connected integrally to the supporting disk and on whose outer jacket surface an endless band is baked. The band is removed from the drum jacket and passed to a processing station immediately adjacent to the baking drum and processed in the station. The baking drum, which is driven via its central hub mounted rotatably in the machine stand, is heated by gas burners or by infrared radiators heated by gas, which are arranged along the outside and the inside of the drum jacket and along the supporting disk, in order to bake the endless band resting on the outside of the drum jacket and to protect the supporting disk from cracks due to thermal stress, which cracks would occur, if the supporting disk were not heated, due to the high temperature differences between the heated drum jacket and the unheated supporting disk.

A baking device of this type having a baking drum heated by gas is used in an installation as it is disclosed in our earlier, commonly assigned U.S. Pat. No. 5,795,607 and international PCT publication WO 95/32630. The process and device for producing rolled wafer cones first produces an endless wafer band which is pliable when warm and, when warm, is divided in a band-processing device into individual fan-shaped wafer pieces which are rolled into wafer cones in a downstream rolling device.

In an installation disclosed in Austrian Patent No. 380 151, a thin wafer band which is pliable when warm is produced on the baking drum and in the downstream band-processing device is folded together in its longitudinal direction, or transversely thereto, into an endless, two-layered or multi-layered, laminated baked band which is further processed, while pliable, in a further, downstream band-processing device.

In an installation disclosed in European published application EP 0 211 353, an endless wafer band which is pliable when warm is produced on the baking drum and, in the downstream band-processing device, is divided into individual wafer leaves which are further processed individually, while pliable, in a further, downstream processing device.

In a baking device disclosed in U.S. Pat. No. 3,829,593, an endless, soft band of dough which is not fully baked is produced on the baking drum and, immediately after being produced, is rolled onto a storage roll. This band of dough, which is still soft and flexible even after cooling down to room temperature, is the starting product for the dough envelopes of Chinese spring rolls which are produced by a soft filling being wrapped up several times in a rectangular leaf of dough cut out from the band of dough before the spring roll thus produced is deep-fried until the dough envelope is crispy and brown.

An installation disclosed in U.S. Pat. No. 3,946,656 and German published patent application DE 24 35 110 is configured for producing prefabricated, Chinese spring rolls. There, a soft band of dough which remains soft even at room temperature is produced on a baking drum and, in a processing device arranged at a distance from the baking drum, is divided into individual, square pieces of dough which are each further processed to form a prefabricated spring roll. In the processing device, a pre-cooked filling mass is applied onto a piece of dough and the piece of dough is folded around the filling mass to form a dough envelope enclosing the latter, and is rolled up. Baking devices having a rotating baking drum which is arranged upright, is driven via its horizontal central hub and is heated along its drum jacket and along its supporting disk by gas burners or by infrared radiators heated by gas, are also used in facilities for continuously producing hollow wafer rolls and small wafer rolls for the production of a thin wafer band which is pliable when warm and, in a processing station directly adjacent to the baking drum, is coiled in a helically overlapping manner to form a sleeve-shaped hollow body which is then cut into the individual hollow wafer rolls or small wafer rolls. For the production of the wafer band, a liquid wafer dough which consists mainly of water, wheat flour and sugar and, based on its flour content, contains between 25% by weight and 100% by weight of sugar, is applied to the outside of the heated, rotating baking drum where it is baked to form an endless band which is pliable when warm. The band is continuously removed from the outside of the baking drum by a removal device and, in the processing station, between a rotating winding roll and a rotating winding mandrel, is continuously coiled around the winding mandrel in a helically overlapping manner to form a sleeve-shaped hollow body which is pushed axially beyond the winding mandrel by the winding process. The sleeve-shaped hollow body, which grows continuously in its longitudinal direction, is cut by a special cutting device into individual longitudinal pieces which, when cooled down to room temperature, take on a crispy, brittle and easily breakable consistency and constitute the hollow wafer rolls or small wafer rolls. In order to produce filled hollow wafer rolls or small wafer rolls, the filling mass can be inserted by a hollow winding mandrel directly into the hollow space in the sleeve-shaped hollow body formed by the baked wafer band, the hollow body then being cut, together with the filling mass contained in it, into the individual, filled hollow wafer rolls or small wafer rolls.

In a baking device which is disclosed in U.S. Pat. No. 4,655,125, an endless band which is baked on one side is produced on a small baking roll which delivers heat from below and has a roll body which is made of metal, encloses a cylindrical inner chamber and encloses a stationary, electrical induction coil which is arranged in its inner chamber and is seated on that immovable, rigid central axis on which the roll body is rotatably mounted on both sides of the induction coil. The central axis is formed by the sleeve-shaped coil former of the induction coil, which coil former bears the wire windings of the induction coil and is provided with a continuous, axial longitudinal slot in order to suppress short-circuit currents heated by it. The roll body has a cylindrical outer jacket which encloses the induction coil on its outside with a small spacing and, on its outside, bears the baking surface of the baking roll and is inductively heated by the electric induction coil. This outer jacket is designed as a water-containing hollow jacket, so that the evaporating or condensing water in its hollow space is able, by absorbing the heat of evaporation or by conveying the heat of condensation, to compensate for the differences in temperature which occur in the outer jacket during the inductive heating. The baking device does not provide any heating device which generates heat from above and, in the baking roll, would be arranged above the baking surface thereof at a distance from the baking roll. This baking device is therefore not suitable for producing endless bands by means of heat from above and heat from below.

International PCT publication WO 92/15183 A1 discloses a baking device having two small baking rolls which deliver heat from below. There, the cake of dough produced on the first baking roll is in each case placed with its upper side downward onto the second baking roll and baked to completion thereon. The baking rolls each have a roll body which encloses a cylindrical inner chamber and have a cylindrical outer jacket made of metal and two disk-shaped side walls made of plastic. This roll body encloses a stationary, electrical induction coil which is arranged in its inner chamber and is seated on that immovable, rigid central axis on which the roll body is mounted rotatably on both sides of the induction coil. The cylindrical outer jacket, which is made of metal and encloses the induction coil on its outside at a small distance, bears, on its outside, the baking surface of the baking roll and is inductively heated by the electrical induction coil. Neither in the first baking roll, nor in the second baking roll does this baking device have a heating device generating heat from above. This baking device is not suitable for producing endless bands by means of heat from above and heat from below.

SUMMARY OF THE INVENTION

It is accordingly an object of the invention to provide a baking device and a baking installation, which overcomes the above-mentioned disadvantages of the heretofore-known devices and methods of this general type and which is further improved in terms of producing endless bands with heat from above and heat from below.

With the foregoing and other objects in view there is provided, in accordance with the invention, a baking device for baking endless bands, comprising:

a cylindrical baking ring made of metal disposed to revolve continuously around a central axis thereof;

the baking ring having an endless baking surface disposed to move through a stationary baking zone;

a feeder device disposed at the baking ring for applying a pourable baking mass onto the baking surface;

a removal device disposed at the baking ring for removing an at least partially baked band produced from the baking mass on the baking surface; and a heating device disposed in the baking zone and arranged at a distance above the baking surface, the heating device having an electric induction coil for inductively heating the baking ring to generate heat for baking the baking mass with heat from below.

In accordance with an added feature of the invention, the baking ring is rotatably mounted outside a central axis thereof in a stationary machine stand of the baking device.

In accordance with an additional feature of the invention, the electric induction coil is arranged at a distance above the baking surface of the baking ring, the induction coil heating the baking ring inductively and, by intrinsic heating thereof, generates heat from above the baking surface for baking the baking mass from above.

In accordance with another feature of the invention, the baking ring carries an endless outer baking surface on an outside thereof through an outer baking zone and an endless inner baking surface on an inside thereof through an inner baking zone, and the baking ring, for generating the heat from below, is inductively heated by the electric induction coil disposed at a distance above at least one of the inner and outer baking surfaces.

In accordance with a further feature of the invention, the induction coil engages in each case at a distance over the outside and the inside of the baking ring, and the induction coil has an outer section generating the heat from above for the outside of the baking ring and an inner section generating the heat from above for the inside of the baking ring.

In accordance with again an added feature of the invention, the electric induction coil is an element disposed at a distance above at least one the baking surface of the baking ring, and the element is curved in an arc shape, elongated in a running direction of the baking ring, and disposed to leave a path of movement thereof free.

In accordance with again another feature of the invention, the electric induction coil is an element projecting in each case at a distance above the baking surfaces of the baking ring and enclosing the baking ring in a C-shape.

In accordance with a concomitant feature of the invention, the electric induction coil is an element projecting in each case at a distance above the baking surfaces of the baking ring and completely enclosing the baking ring.

In other words, the objects of the invention are achieved with a baking device for producing endless bands by means of heat from above and heat from below is proposed, wherein a cylindrical baking ring which is made of metal, revolves continuously around its central axis in one direction and is rotatably mounted outside its central axis in the stationary machine stand of the baking device is provided, which baking ring moves an endless baking surface through a stationary baking zone which is provided with a heating device, which is arranged at a distance above the baking surface and generates heat from above, and extends in the running direction of the baking ring from a feeder device, which applies a pourable baking mass onto the baking surface, as far as a removal device for the at least partially baked band produced from the baking mass on the baking surface. According to the invention, this baking device is wherein in order to generate the heat from below, a heating device which is arranged at a distance above the baking surface and inductively heats the baking ring is provided, which device has an electric induction coil for inductively heating the baking ring. This baking device can also be integrated in a facility for producing and processing endless bands, wherein there is arranged downstream of the baking device at least one processing station for the bands produced by the device.

In the baking device according to the invention, in order to generate the heat from below, the revolving baking ring which bears the baking surface is inductively heated by a stationary electric induction coil which is arranged above the baking surface and at a distance therefrom. The induction coil may be arranged above the baking surface and next to the heating device generating the heat from above or may be integrated in the heating device. In a single-track baking device having an outer baking zone and an outer baking surface arranged on the outside of the baking ring, the heating device which is arranged above the outer baking surface and at a distance therefrom and inductively heats the baking ring can be arranged, together with the heating device which is likewise arranged above the outer baking surface and at a distance therefrom, but generates the heat from above, in the exterior of the baking device surrounding the baking ring. In a single-track baking device having an inner baking zone and an inner baking surface arranged on the inside of the baking ring, the heating devices which are arranged above the inner baking surface at a distance from the baking ring and inductively heat the baking ring can be arranged in the interior of the baking device which is enclosed by the baking ring, next to the heating device which is likewise arranged above the inner baking surface at a distance from the baking ring, but generates the heat from above.

By means of the design according to the invention of the baking device, the entire quantity of heat, which is required for the process of drying and baking the baking mass in contact with the baking ring and acts on each band of baking mass as heat from above or below, can be generated by one or more, electric induction coils which are provided for the inductive heating of the baking ring and mainly heat the baking ring and themselves. This applies to single-track and also to multi-track baking devices. In the single-track baking devices, the baking ring bears in each case an endless baking surface either only on the outside, or both on the inside and on the outside, which baking surface is assigned within the baking device its own baking zone for producing an endless band. In the multi-track baking devices, the baking ring bears, on the outside and on the inside, in each case two or more endless baking surfaces which are arranged next to one another and which are each assigned, within the baking device, their own baking zone for producing an endless band.

The design according to the invention of the baking device permits a rapid and careful, inductive heating of the baking ring and of its respective baking surface up to that operating temperature which is appropriate for the drying and baking process and is adjusted to the endless band to be produced in each case. Both the heating-up of the baking ring to its operating temperature and the maintaining of the operating temperature of the baking ring during the continuous production of an endless band are undertaken by the inductive heating of the baking ring. For additional browning the top side of an endless band, an electrically heated infrared radiator may be arranged in the relative baking zone, in the vicinity of the band-removing device, above the baking surface bearing the endless band.

When carrying out the drying and baking processes required for producing the endless bands, the heating of the baking ring and of the bands of baking mass resting on the baking surfaces thereof by the combustion adjacent to the baking ring of heating gases can be completely dispensed with in the design according to the invention of the baking device. This permits considerable simplifications and savings in the realization of a baking device according to the invention, wherein, during operation of the baking device, the casing surrounding the baking ring is now heated merely by the induction coil and the inductively heated baking ring and by the infrared radiators provided, if need be, for browning the topside of the band. It is now merely necessary to remove from the casing, by suction, the baking vapors which are generated by the drying or baking process and primarily consist of the gases which arise in the baking mass during the drying or baking process and escape therefrom, such as steam, and of the volatile substances which escape from the baking mass and account for only a very small part of the volume of the baking vapors. The volume of baking vapors to be continuously removed by suction from the casing is very much smaller than the gas volume which has to be continuously removed by suction from the casing in the known baking devices which are heated by gas. In a baking device which is heated by gas, on the one hand very large amounts of air are continuously sucked into the casing from the surroundings of the baking device with the aid of the exhaust fan assigned to the exhaust channel of the casing, in order to supply the gas burners with the necessary combustion air and to continuously cool down the combustion gases generated by these gas burners, by the admixture of air, to a baking temperature of the baking mass which is far below the combustion temperature of the heating gas, and, on the other hand, the sucked-in amounts of air are continuously removed from the casing by suction together with the very large amounts of combustion gases generated by the gas burners and the baking vapors which are produced by the drying or baking process.

Compared to a gas-heated baking device, in a baking device according to the invention not only can the gas burners adjacent to the baking ring be omitted together with the heating-gas pipes leading to said gas burners, but so too can the extensive, structural precautions which are required for the sucking-in of very large amounts of air into the casing and for the removal by suction of even larger amounts of gas from the casing. This permits a considerable simplification of the baking device and of the devices required for discharging the gases from the casing. The heat-insulating jacket surrounding the casing can also be of simpler design and can be realized in a more cost-effective manner in accordance with the lower operating temperatures in the interior of the casing.

According to a further feature of the invention, an electric induction coil which is arranged at a distance above the baking surface of the baking ring and inductively heats the baking ring can be provided, which coil, through its intrinsic heating, also generates the heat from above for this baking surface arranged at a distance below it.

This design of the baking device makes it possible to produce, by means of heat from above and heat from below, endless bands on a revolving baking ring which is heated only by an electric induction coil. The electric induction coil can be arranged in a stationary heating element adjacent to the baking ring, the heat inductively generated in the baking ring by the induction coil acting as heat from below, and the heat generated in the heating element by heating the induction coil to its operating temperature acting as heat from above on the baking mass which is in contact with the endless baking surface of the revolving baking ring. In order to inductively heat the baking ring, use may also be made of an electric induction coil which radiates heat outward in order to cool itself and wherein the heat inductively generated in the baking ring by it acts as heat from below, and the heat radiated by it for cooling purposes acts as heat from above on the baking mass in contact with the baking surface of the baking ring. In this design, the heat which occurs in the induction coil during the operation of the induction coil while the baking ring is being inductively heated can be used as heat from above for the drying and baking process of the baking mass in contact with the baking ring, while the amount of heat radiated as heat from above serves for cooling the induction coil during its operation. During the course of configuring the baking device according to the invention with regard to the drying and baking process to be carried out during production of endless bands from a given baking mass, the surface temperature of the heating element producing the heat from above is determined, and the amount of heat which is available as heat from above via the heating element is generated by the heating of the induction coil and is used for cooling the induction coil.

According to a further feature of the invention, a baking ring which, on its outside, moves an endless baking surface through an outer baking zone and, on its inside, moves an endless baking surface through an inner baking zone can be provided, which ring, in order to generate the heat from below, is inductively heated by an electric induction coil which is arranged at a distance above at least one of its baking surfaces.

In this design of the baking device with a baking ring bearing baking surfaces on both sides, the induction coil heating it inductively is arranged, according to the invention, at a distance from and above at least one of its baking surfaces. The induction coil can be arranged next to the heating device generating the heat from above for this baking surface or can be integrated therein. According to the invention, the induction coil may be designed in such a manner that it generates the heat from above for this baking surface through its intrinsic heating, while it simultaneously generates the heat from below for all of the baking surfaces of the baking ring by inductive heating of the baking ring.

According to another feature of the invention, in order to inductively heat the baking ring, an electric induction coil which engages in each case at a distance over the outside and inside of said baking ring can be provided which, by its outer section, generates the heat from above for the outside of the baking ring and, by its inner section, generates the heat from above for the inside of the baking ring.

In this design of the baking device having a baking ring bearing baking surfaces on both sides, the induction coil can engage over both sides of the baking ring in each case at a distance, and can be arranged next to the heating device generating the heat from above on the particular side or can be integrated therein. According to the invention, the induction coil may be designed in such a manner that it generates the heat from above for all of the baking surfaces of the baking ring through its intrinsic heating, while it simultaneously generates the heat from below for all of the baking surfaces of the baking ring by inductive heating of the baking ring.

According to a further feature of the invention, the electric induction coil can be designed as an element which is arranged at a distance above at least one baking surface of the baking ring, is curved in an arc-shaped manner, is elongated in the running direction of the baking ring and leaves the path of movement thereof free. In this connection, the electric induction coil can be designed as an element which engages in each case at a distance above the baking surfaces of the baking ring and engages around the baking ring in a C-shaped manner. According to the invention, the electric induction coil can also be designed as an element which engages in each case at a distance above the baking surfaces of the baking ring and engages completely around the baking ring.

Other features which are considered as characteristic for the invention are set forth in the appended claims.

Although the invention is illustrated and described herein as embodied in a baking device for producing endless bands, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
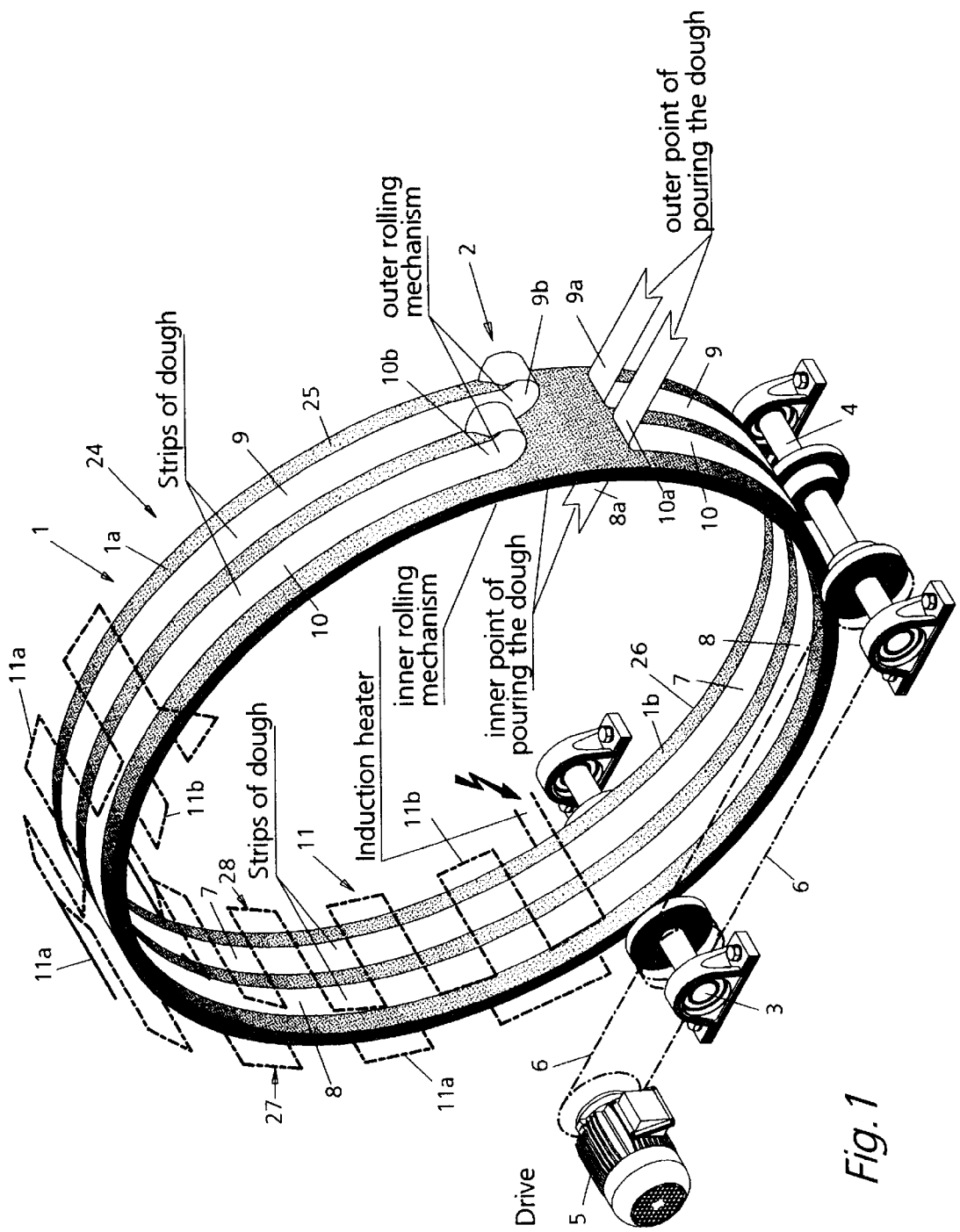
FIG. 1 is a top-perspective, diagrammatic and schematic view of a multi-track facility for producing small wafer rolls.

Referring now to the figures of the drawing in detail and first, particularly, to FIG. 1 thereof, there is shown a multi-track device for producing small wafer rolls and hollow wafer rolls. Two endless wafer bands 7/8 and 9/10 which are pliable when warm are respectively produced on the inside and outside of a revolving baking ring 1 which is arranged upright. The wafer bands are coiled up in a band-processing station 2 by means of rolling mechanisms which are adjacent to the inside and outside of the baking ring and are only indicated schematically in FIG. 1, in a helically overlapping manner to form sleeve-shaped hollow bodies which are divided into the individual small wafer rolls or hollow wafer rolls. In the vicinity of its lower apex, the baking ring 1 rests with its lower side on two drive shafts 3, 4 which are arranged at a spacing distance from each other in a non-illustrated machine stand or machine frame. The drive shafts 3 and 4 carry the baking ring 1 and they are driven by a driving motor 5 via an endless driving chain 6.

The cylindrical baking ring 1 bears, on its outer and inner jacket surfaces 1a and 1b, which are each concentric with respect to its central axis, a respective endless baking surface 1a', 1b' which are assigned two stationary baking zones arranged next to each other. The baking zones are represented in FIG. 1 by the strips of dough 7, 8, 9, 10 which extend in the respective baking zone from the point at which the dough is poured 8a, 9a, 10a along the circumference of the baking ring 1 as far as the band removal point 9b, 10b. In each baking zone, the band removal point 9b, 10b is arranged in the region of the front apex of the baking ring 1 above the point of pouring of the dough 8a, 9a, 10a. The wafer band baked on the baking ring 1 is removed at the band removal point 9b, 10b and supplied directly to the respective rolling mechanism.

The revolving baking ring 1, and the strips of dough 7, 8, 9, 10 which are in contact with it and revolve with it, are heated by a stationary, electric induction coil 11 which extends along the path of movement of the baking ring 1 in the region of the lower half of the baking ring 1 and, for all four baking zones, generates the heat from below and heat from above which are required for baking the four strips of dough 7, 8, 9, 10. The electric induction coil 11, which is disposed in a meandering course, is of essentially flat design and has an outer half 11a extending along the outside of the baking ring 1, and an inner half 11b extending along the inside of the baking ring 1. The baking ring 1, which is arranged between the two halves 11a and 11b of the induction coil 11, passes through the magnetic field generated by the induction coil 11 and is inductively heated by the induction coil 11. The heat generated inductively in the baking ring 1 acts as heat from below on the strips of dough 7, 8, 9, 10 which are in contact with the two baking surfaces 1a', 1b' of the baking ring. The heat radiated from the induction coil 11, which is heated to its operating temperature, acts, in the region of the outer half 11a of the induction coil 11, as heat from above on the two outer strips of dough 9 and 10 and, in the region of the inner half 11b of the induction coil 11, as heat from above on the two inner strips of dough 7 and 8.

Figure 2:
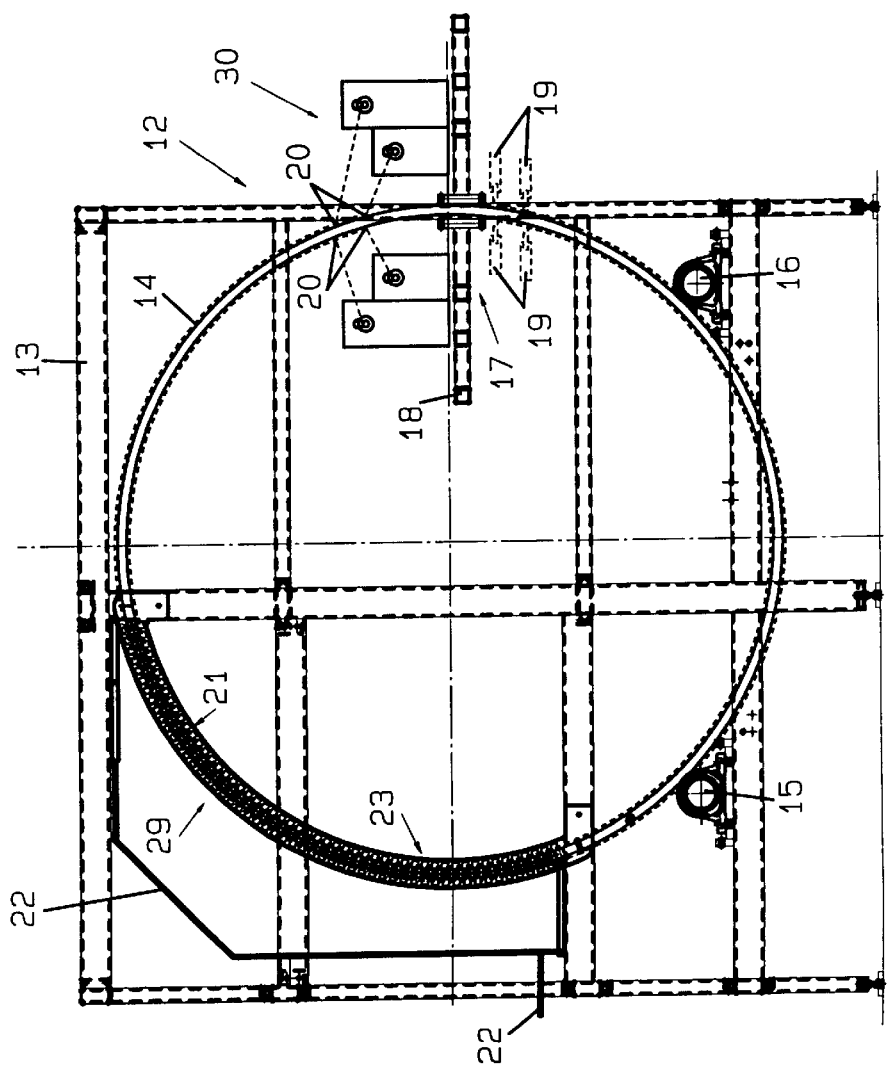
FIG. 2 diagrammatic side elevational view of a baking device having a revolving baking ring and a first embodiment of an electric induction coil for inductively heating the baking ring.

FIG. 2 shows a baking device 12 according to the invention having a stationary machine stand 13 wherein a revolving, cylindrical baking ring 14 made of metal rests on two horizontal drive shafts 15, 16 which cause the baking ring 14 to rotate about its central axis. In the region of the vertex 17 of the baking ring 14, which is illustrated on the right in FIG. 2, the stationary feeder devices 19 for the baking mass are arranged below the horizontal plane 18 which runs through the horizontally extending central axis of the baking ring 14. The stationary band-removing devices 20 are arranged above the plane 18. In each baking zone, the baking mass applied to the outside and inside of the baking ring 14 forms a continuous band which extends along the circumference of the baking ring 14 through an angular region of approximately 340° from the baking-mass feeding device 19 as far as the band-removing device 20. In that half of the machine stand 13 which is illustrated on the left in FIG. 2, an electric induction coil 21 is provided as the heating device 24, which coil surrounds the baking ring 14 at a distance, is designed such that it is elongated in the direction wherein the baking ring 14 revolves and has windings running essentially transversely with respect to the direction wherein the baking ring 14 revolves. The induction coil 21 is connected via the electric lines 22 to a device for generating the electric alternating current used for operation of the induction coil 21. The induction coil 21 may be fitted into a tubular heating element of rectangular cross section which extends along the path of movement of the baking ring 14 and is heated by the operating heat of the induction coil 21.

In order to inductively heat a baking ring having a width of 400 mm and a thickness of 30 mm, use can be made of an induction coil with a heating capacity of 75 kW which is supplied with a current of 520 A and an alternating-current frequency of 1.1 kHz.

Figure 3:
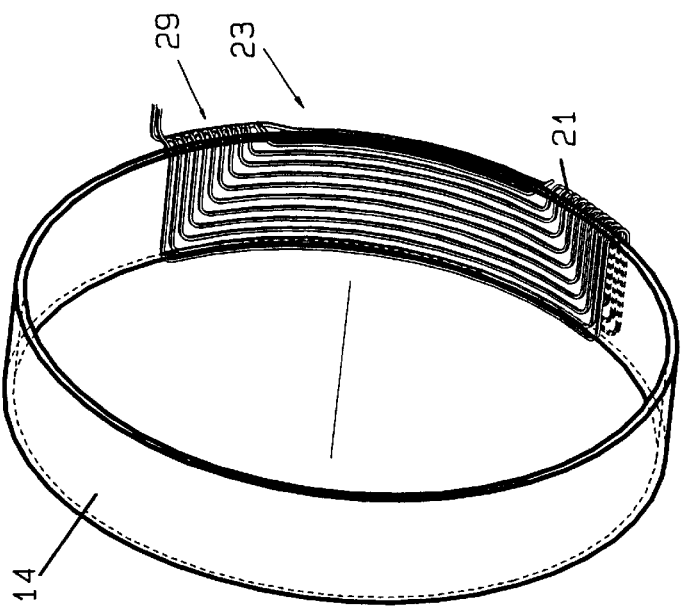
FIG. 3 is an oblique perspective view of a baking ring having a second embodiment of an electric induction coil for inductively heating the baking ring.

FIG. 3 shows an exemplary embodiment for an electric induction coil 21 which surrounds a baking ring 14 in the region of its vertex 23, which is illustrated on the right in FIG. 3, over an angular range of 90° ($\pi/2$ radians) and has windings mainly running in the direction wherein the baking ring 14 revolves.

We claim:

1. A baking device for baking endless bands, comprising:
   a cylindrical baking ring made of metal disposed to revolve continuously around a central axis thereof;
   said baking ring having an endless baking surface disposed to move through a stationary baking zone;
   a feeder device disposed at said baking ring for applying a pourable baking mass onto said baking surface;
   a removal device disposed at said baking ring for removing an at least partially baked band produced from the baking mass on said baking surface; and
   a heating device disposed in said baking zone and arranged at a distance above said baking surface, said heating device having an electric induction coil for inductively heating the baking ring to generate heat for baking the baking mass with heat from below.

2. The baking device according to claim 1, wherein said baking ring is rotatably mounted outside a central axis thereof in a stationary machine stand of the baking device.

3. The baking device according to claim 1, wherein said electric induction coil is arranged at a distance above said baking surface of said baking ring, said induction coil heating the baking ring inductively and, by intrinsic heating thereof, generates heat from above said baking surface for baking the baking mass from above.

4. The baking device according to claim 1, wherein said baking ring carries an endless outer baking surface on an outside thereof through an outer baking zone and an endless inner baking surface on an inside thereof through an inner baking zone, and said baking ring, for generating the heat from below, is inductively heated by said electric induction coil disposed at a distance above at least one of said inner and outer baking surfaces.

5. The baking device according to claim 4, wherein said induction coil engages in each case at a distance over the outside and the inside of said baking ring, and said induction coil has an outer section generating the heat from above for the outside of said baking ring and an inner section generating the heat from above for the inside of said baking ring.

6. The baking device according to claim 1, wherein said electric induction coil is an element disposed at a distance above at least one said baking surface of said baking ring, and said element is curved in an arc shape, elongated in a running direction of said baking ring, and disposed to leave a path of movement thereof free.

7. The baking device according to claim 6, wherein said electric induction coil is an element projecting in each case at a distance above said baking surfaces of said baking ring and enclosing said baking ring in a C-shape.

8. The baking device according to claim 6, wherein said electric induction coil is an element projecting in each case at a distance above said baking surfaces of said baking ring and completely enclosing said baking ring.

9. A baking installation, comprising:
   a baking device for baking endless bands with heat from above and heat from below; and
   at least one processing station disposed downstream of said baking device in a product processing direction for processing the bands;
   said baking device having:
      a cylindrical baking ring made of metal disposed to revolve continuously around a central axis thereof, said baking ring having an endless baking surface disposed to move through a stationary baking zone;
      a feeder device disposed at said baking ring for applying a pourable baking mass onto said baking surface;
      a removal device disposed at said baking ring for removing an at least partially baked band produced from the baking mass on said baking surface; and
      a heating device disposed in said baking zone and arranged at a distance above said baking surface, said heating device having an electric induction coil for inductively heating the baking ring to generate heat for baking the baking mass with heat from below.

10. The baking device according to claim 9, wherein said baking ring is rotatably mounted outside a central axis thereof in a stationary machine stand of the baking device.

11. The baking device according to claim 9, wherein said electric induction coil is arranged at a distance above said baking surface of said baking ring, said induction coil heating the baking ring inductively and, by intrinsic heating thereof, generates heat from above said baking surface for baking the baking mass from above.

12. The baking device according to claim 9, wherein said baking ring carries an endless outer baking surface on an outside thereof through an outer baking zone and an endless inner baking surface on an inside thereof through an inner baking zone, and said baking ring, for generating the heat from below, is inductively heated by said electric induction coil disposed at a distance above at least one of said inner and outer baking surfaces.

13. The baking device according to claim 12, wherein said induction coil engages in each case at a distance over the outside and the inside of said baking ring, and said induction coil has an outer section generating the heat from above for the outside of said baking ring and an inner section generating the heat from above for the inside of said baking ring.

14. The baking device according to claim 9, wherein said electric induction coil is an element disposed at a distance above at least one said baking surface of said baking ring, and said element is curved in an arc shape, elongated in a running direction of said baking ring, and disposed to leave a path of movement thereof free.

15. The baking device according to claim 14, wherein said electric induction coil is an element projecting in each case at a distance above said baking surfaces of said baking ring and enclosing said baking ring in a C-shape.

16. The baking device according to claim 14, wherein said electric induction coil is an element projecting in each case at a distance above said baking surfaces of said baking ring and completely enclosing said baking ring.

* * * * *